3,795,713
Patented Mar. 5, 1974

3,795,713
THERMAL CRACKING OF LIQUID HYDROCARBONS
Koichi Washimi and Masaaki Kanbayashi, Fukushima, Toshio Kanai, Kanagawa, and Kiyoju Ozaki, Fukushima, Japan, assignors to Kureha Kagaku Kogyo Kabushiki Kaisha, Tokyo, Japan
No Drawing. Continuation-in-part of abandoned application Ser. No. 13,239, Feb. 21, 1969. This application Aug. 2, 1972, Ser. No. 277,198
Claims priority, application Japan, Feb. 21, 1969, 44/12,544
Int. Cl. C07c 11/24, 3/00
U.S. Cl. 260—679 R        3 Claims

ABSTRACT OF THE DISCLOSURE

A process for thermally cracking a heavy liquid hydrocarbon oil by spraying the hydrocarbon oil into a reactor maintained at a temperature higher than 800° C., and a pressure between atmospheric and 10 kg./sq. cm., which process comprises preheating the heavy hydrocarbon oil to temperatures of 200–500° C., and then spraying said hydrocarbon oil into the reactor through a nozzle or nozzles at a pressure higher than 20 kg./sq. cm., to flash-evaporate more than 5% by weight, preferably above 5 to about 50% by weight, of said hydrocarbon oil, whereby the hydrocarbon oil is finely atomized to form droplets of from 10–15 microns and preferably, 18–50 microns.

Cross-Reference to Related Application

This application is a continuation-in-part application of our earlier co-pending application Ser. No. 13,239, now abandoned, claiming priority from Feb. 21, 1969, based on Japanese patent application No. 12,544/44.

BACKGROUND OF THE INVENTION

1. Field of the invention

The present invention relates to the high-temperature thermal cracking of heavy liquid hydrocarbon oils, such as crude and other heavy oils.

2. Description of the prior art

When it is desired to obtain acetylene, olefins, aromatics and aromatic tars in good yield by the thermal cracking of heavy liquid hydrocarbon oils such as crude oil and heavy gas oil at temperatures above 800° C., a process is usually employed wherein the feed oil is sprayed into a reactor as fine liquid droplets. However, unless the reaction time is maintained as short as from 0.01 to 0.001 second, the products formed by thermal cracking further react severely to form cokes, etc. Therefore, in such a system, it is necessary that the feed hydrocarbon oil supplied to the reactor be quite rapidly evaporated, whereby the temperature of the hydrocarbon oil is immediately increased to the reaction temperature. Since the liquid evaporation rate largely depends upon the size of the liquid droplets, it is also required that the oil be finely atomized.

Methods of finely atomizing liquids are known wherein the liquid is atomized by means of a high speed gas jet and wherein the liquid is atomized by spraying the liquid itself through a nozzle or nozzles at high speed.

The former method requires almost equal amounts of carrier gas (e.g., steam) and feed oil to obtain sufficient atomization so that the evaporation of the liquid drops can be completed in the required short period of time and the presence of such large amounts of carrier gas severely reduces the efficiency of the thermal cracking reaction. In the latter method, even if the rate of spraying of the feed oil is increased, the size of the liquid droplets obtained is not small enough to satisfy the aforesaid requirements for preventing the formation of coke.

SUMMARY OF THE INVENTION

Applicants have discovered that fine liquid droplets of heavy hydrocarbon oil satisfying the above-mentioned requirements can be obtained economically merely by spraying the heavy hydrocarbon oil into the reactor under a pressure of about 20–100 kg./sq. cm., thus utilizing the flashing phenomenon of the volatile materials contained in the hydrocarbon oil to atomize it to a droplet size of from 10–50 microns and preferably, from 18–50 microns.

DETAILED DESCRIPTION OF THE INVENTION

That is, according to the process of this invention, a heavy hydrocarbon oil can be readily atomized so that the size of the atomized fine liquid droplets surprisingly reaches $1/10$ of the size of liquid droplets obtained by the conventional high pressure spraying method, i.e., 10–50 microns and preferably, 18–50 microns.

It is also necessary, in the practice of the process of this invention, to preheat the feed hydrocarbon oil to a temperature which causes the abrupt flashing of the hydrocarbon oil under the reduced pressure existing directly after the spraying of the hydrocarbon oil through the nozzle.

However, applicants have further discovered that the flashing effect is reduced if the amount of flashable material in the feed oil is less than 5%, while even if this amount is larger than 50%, the flashing effect is not further increased.

Moreover, it sometimes happens that when too heavy an oil is employed as the feed oil in the process of this invention, the preheating temperature for satisfying the aforesaid requirements is too high and the feed oil may begin cracking before the oil reaches the nozzle. In such case, the required preheating temperature may be reduced by admixing a hydrocarbon oil which is readily volatizable so as to flash 5–50% of the total feed oil without preheating the heavy feed oil to the higher temperature.

The required preheating temperature depends on the kind and nature of the feed oil to be employed and the proportion of flashable material in the feed oil, but is preferably 200–400° C.

The invention will be further illustrated by the following example.

EXAMPLE

Crude oil was thermally cracked in a series of experiments carried out at a temperature of 1300° C., a reaction pressure of 5 kg./sq. cm., gauge and for a reaction period of 0.005 second in a thermal-cracking furnace having a reactor section of 3 liters in capacity. That is, a crude oil having an API gravity of 37 was sprayed into a hydrogen-oxygen flame (oxygen free) [1] controlled by steam to 2000° C., through nozzles, each nozzle having a diameter of 0.3 mm., at a pressure of 100 kg./sq. cm., gauge and at a rate of 100 liters/hour. In the experiments, the preheating temperatures employed were 70° C., 200° C., 300° C.,

| Experiment number | (1) | (2) | (3) | (4) | (5) |
|---|---|---|---|---|---|
| Preheating temp. (° C.) | 70 | 200 | 300 | 350 | 400 |
| Flashed proportion of total oil (wt. percent) | 0 | 5 | 33 | 50 | 60 |
| Mean size of drops sprayed (microns) | 70 | 50 | 23 | 18 | 18 |
| Gasification ratio (wt. percent) | 30 | 40 | 65 | 68 | 68 |
| Yield of acetylene and ethylene (wt. percent) | 23 | 30 | 46 | 48 | 48 |

350° C., and 400° C., respectively. The results are shown in the table.

[1] After hydrogen and oxygen are burned no $O_2$ remained.

In Experiments (1) and (2), the accumulation of coke on the inside wall of the reaction chamber was very severe and it was confirmed to be caused by coking of the unevaporated liquid droplets attached to the inside wall of the reaction chamber. On the other hand, in Experiments (3), (4) and (5) of the present invention, the inside wall of the reaction chamber was very clean and no accumulation of coke on the wall was observed.

We claim:

1. In a process for thermally cracking a heavy hydrocarbon oil to obtain acetylenes, olefins, aromatics and aromatic tars by spraying the hydrocarbon oil into a reaction chamber maintained at a temperature above 800° C., and a pressure of from atmospheric to 10 kg./sq. cm., the improvement which comprises preheating the heavy hydrocarbon oil to 200–500° C., and spraying said oil into the reaction chamber through at least one nozzle under a pressure higher than 20 kg./sq. cm., to flash-evaporate more than 5% by weight of said feed oil, whereby the feed oil is finely atomized to form droplets of from 10 to 50 microns.

2. The process of claim 1 wherein the amount of oil flash-evaporated is between 5 to 50% by weight of said feed oil and said oil is finely atomized to form droplets of 18 to 50 microns.

3. The process of claim 1 wherein the heavy hydrocarbon oil contains less than 5% by weight volatizable oil and volatizable oil is added to the heavy hydrocarbon oil to provide at least 5% by weight volatiles in the total oil.

References Cited
UNITED STATES PATENTS

| | | | |
|---|---|---|---|
| 3,303,103 | 2/1967 | Schmidt et al. | 196—116 |
| 2,895,804 | 7/1959 | Heller | 23—209.4 |
| 1,823,503 | 9/1931 | Mittasch et al. | 260—679 |
| 3,026,185 | 3/1962 | Takewell et al. | 23—259.5 |
| 3,003,855 | 10/1961 | Heller et al. | 23—209.4 |

PAUL M. COUGHLAN, JR., Primary Examiner

J. M. NELSON, Assistant Examiner

U.S. Cl. X.R.

260—683 R; 423—450